April 1, 1924.
E. D. WEINBERG
UTENSIL
Filed July 15, 1922
1,489,182
2 Sheets-Sheet 1
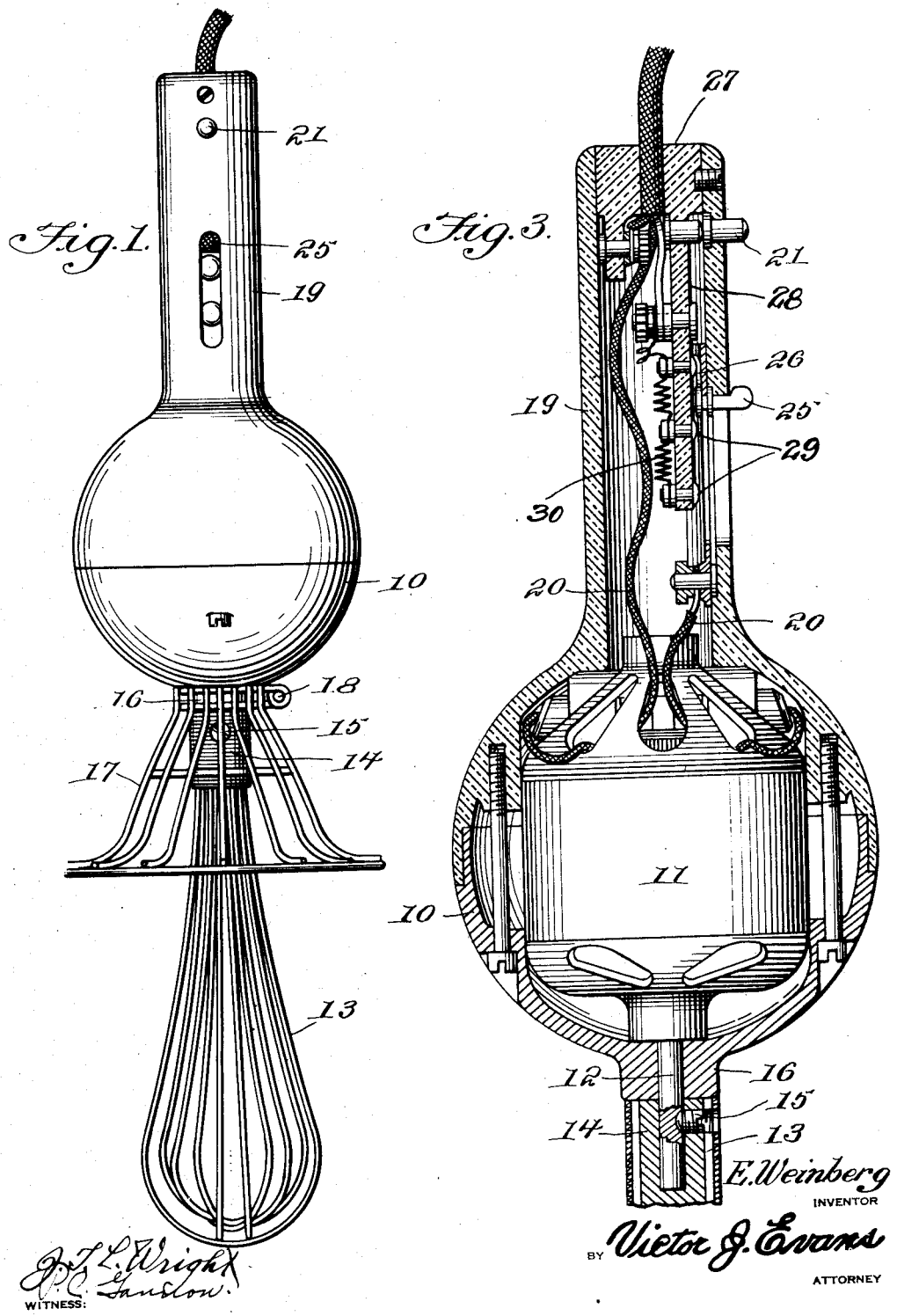

April 1, 1924.
E. D. WEINBERG
UTENSIL
Filed July 15, 1922
1,489,182
2 Sheets-Sheet 2
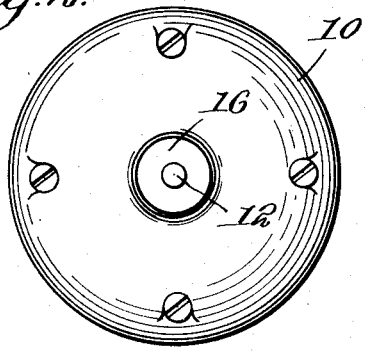
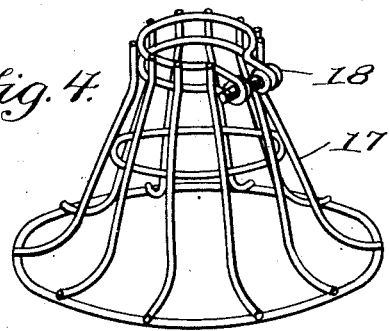
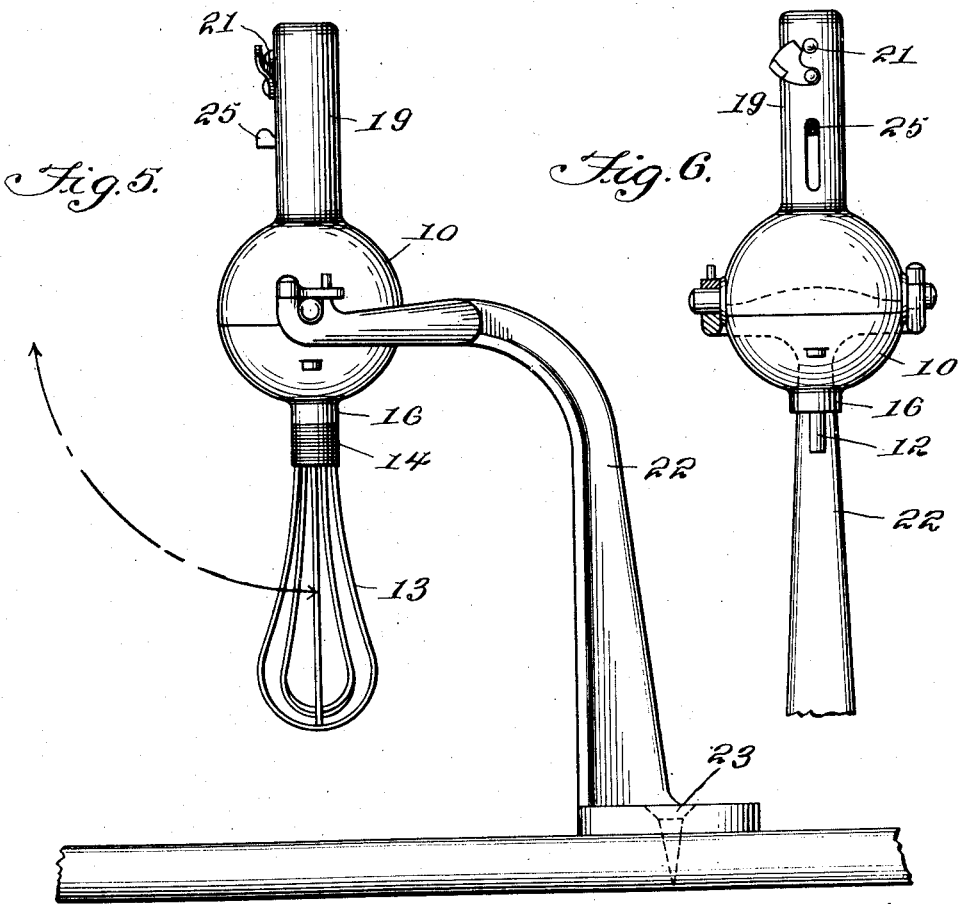
E. Weinberg
INVENTOR
BY Victor J. Evans
ATTORNEY
WITNESS:

Patented Apr. 1, 1924.

1,489,182

UNITED STATES PATENT OFFICE.

EMIL D. WEINBERG, OF NEW YORK, N. Y.

UTENSIL.

Application filed July 15, 1922. Serial No. 575,179.

*To all whom it may concern:*

Be it known that I, EMIL D. WEINBERG, a citizen of the United States, residing at New York, in the county of New York and State of New York, have invented new and useful Improvements in Utensils, of which the following is a specification.

This invention relates to improvements in culinary articles and has for an object the provision of a motor driven utensil which is capable of use as a beater or whipper and which in addition to saving time and labor in the preparation of foods will also perform its work in a more efficient manner.

Another object of the invention is the provision of a motor driven utensil, which is simple in construction and operation, reliable in use and which may be easily handled and controlled.

Another object of the invention is the provision of means for protecting the user of the invention against injury from the agitator or beater, which forms a part of the invention.

With the above and other objects in view, the invention further includes the following novel features and details of construction, to be hereinafter more fully described, illustrated in the accompanying drawings and pointed out in the appended claim.

In the drawings:—

Figure 1 is an elevation of a hand portable, motor driven utensil, constructed in accordance with the invention.

Figure 2 is an end view of the same looking at the agitator end.

Figure 3 is a central longitudinal sectional view with the motor in elevation.

Figure 4 is a detail perspective view of the agitator guard.

Figure 5 is a view showing the invention secured to a table or shelf so as to provide a stationary article.

Figure 6 is a front elevation of Figure 5, parts being broken away and other shown in section.

Referring in detail to the drawings, wherein like characters of reference denote corresponding parts, the reference character 10 indicates a housing, which may be substantially spherical in shape and which is designed to include an electric motor 11. The shaft 12 of this motor extends through an opening provided in the housing and has secured thereon an agitator or beater 13.

The said agitator or beater is preferably removably secured to the shaft 12 and for this purpose the said agitator or beater is provided with a collar 14, having a threaded opening therein for the reception of a stud screw 15, whose inner end engages a socket or depression provided in the shaft 12. The beater may thus be removably secured, so as to permit of the use of a different beater or agitator, when desired.

Formed on the housing 10 and surrounding the shaft 12 is a cylindrical boss or extension 16 and removably secured upon this extension is a protecting screen or cage 17, the latter being provided with an adjustable neck portion which is adapted to fit the boss or extension 16 and to be held upon said extension by means of an adjusting screw 18. The screen or protector 17 is substantially L-shaped and extends downward around the agitator or beater 13 a sufficient distance to protect the user of the device and at the same time not interfere with its operation.

Extending from the housing 10 diametrically opposite the shaft 12 is a substantially cylindrical handle 19, through which extends insulated conductor wires 20 to provide means for connection with a source of electric current. Current to the motor is controlled by a spring actuated push button switch 21, which is normally open and is held in closed position for the operation of the agitator or beater.

The agitator or beater is capable of operation at different speeds, such as slow, medium and fast and for this purpose, there is provided a shifter button 25, which operates a speed controlling switch 26, which button may be set, so that when the push button switch 21 is actuated, the agitator or beater will be operated at a speed controlled by the switch 26. Received in the upper end of the tubular member 19 is a plug of non-conducting material 27 and depending from this plug and extending longitudinally within the tubular member 19 is a longitudinal extension 28 to which a plurality of spaced contacts 29 are carried. These spaced contacts are in circuit with one of the conductors 20 and are electrically connected together by resistance elements 30.

The device as shown in Figures 1 to 4 of the drawings is of the hand portable type, but if desired may be carried by a bracket arm 22, which is provided with means indicated at 23, whereby the same may be clamped to a table or other support, as illustrated in Figure 5 of the drawings.

The invention is susceptible of various changes in its form, proportions and minor details of construction and the right is herein reserved to make such changes as properly fall within the scope of the appended claim.

Having described the invention what is claimed is:—

A device of the character described comprising a casing, a motor mounted therein, a tubular member carried by the casing and having a longitudinal slot, a non-conducting plug in the upper end of the tubular member, a longitudinal extension carried thereby and opposed with the slot, a plurality of spaced contacts carried by the longitudinal extension, resistance elements connecting the same together, electric conductors in circuit with the motor and spaced contacts and a movable contact slidable in the slot and successively engageable with the spaced contacts.

In testimony whereof I affix my signature.

EMIL D. WEINBERG.